(12) United States Patent  (10) Patent No.: US 9,134,836 B2
Takano et al.  (45) Date of Patent: Sep. 15, 2015

(54) ELECTRONIC DEVICE WITH TOUCH PANEL FOR DECREASING POINTER WOBBLE

(71) Applicant: PANASONIC CORPORATION, Osaka (JP)

(72) Inventors: Tomoki Takano, Kanagawa (JP); Kiyoshi Ikeda, Kanagawa (JP); Atsushi Hirai, Kanagawa (JP); Yuuichi Takizawa, Tokyo (JP); Takeshi Yamaguchi, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 25 days.

(21) Appl. No.: 14/164,521

(22) Filed: Jan. 27, 2014

(65) Prior Publication Data

US 2014/0240251 A1   Aug. 28, 2014

(30) Foreign Application Priority Data

Feb. 26, 2013   (JP) .................................. 2013-036342

(51) Int. Cl.
*G06F 3/038*   (2013.01)
*G06F 3/041*   (2006.01)

(52) U.S. Cl.
CPC ................ *G06F 3/041* (2013.01); *G06F 3/038* (2013.01); *G06F 2203/04101* (2013.01)

(58) Field of Classification Search
CPC ..... G06F 3/041; G06F 3/044; G06F 3/04886; G06F 2203/04101; G06F 3/038; G06F 3/048
See application file for complete search history.

(56) References Cited

U.S. PATENT DOCUMENTS

| 2002/0000977 | A1  | 1/2002  | Vranish |
| 2002/0060668 | A1  | 5/2002  | McDermid |
| 2007/0198942 | A1* | 8/2007  | Morris ........................... 715/767 |
| 2007/0283263 | A1* | 12/2007 | Zawde et al. ................. 715/700 |
| 2008/0005703 | A1  | 1/2008  | Radivojevic et al. |
| 2008/0122798 | A1  | 5/2008  | Koshiyama et al. |

(Continued)

FOREIGN PATENT DOCUMENTS

| JP | 2007-027034 | 2/2007 |
| JP | 2007-535774 | 12/2007 |

(Continued)

OTHER PUBLICATIONS

Japan Office Action in JP2013-36342, mail date is Jan. 28, 2014, together with English translation thereof.

(Continued)

*Primary Examiner* — Larry Sternbane
(74) *Attorney, Agent, or Firm* — Greenblum & Bernstein, P.L.C.

(57) ABSTRACT

Provided is an electronic device. The electronic device includes a planar display unit, and a touch panel which is disposed so as to overlap the display unit and is capable of detecting a vertical distance between two-dimensional coordinates along a surface of the display unit and a finger. Resolution of the two-dimensional coordinates becomes finer as the vertical distance decreases. Thus, even when the operating finger is immobilized in a state where the electronic device is fixed, a display of a pointer is not wobbled or a display of a screen is not wobbled. In addition, when a line is drawn using a drawing mode, the line is not displayed jaggedly.

5 Claims, 13 Drawing Sheets

(56) References Cited

U.S. PATENT DOCUMENTS

| | | |
|---|---|---|
| 2008/0278450 A1 | 11/2008 | Lashina |
| 2008/0309631 A1 | 12/2008 | Westerman et al. |
| 2009/0128498 A1 | 5/2009 | Hollemans et al. |
| 2011/0279364 A1 | 11/2011 | Koshiyama et al. |
| 2012/0050333 A1* | 3/2012 | Bernstein ............... 345/660 |
| 2012/0242608 A1 | 9/2012 | Koshiyama et al. |
| 2012/0327041 A1* | 12/2012 | Harley et al. ............ 345/179 |
| 2014/0111430 A1 | 4/2014 | Shima |

FOREIGN PATENT DOCUMENTS

| | | |
|---|---|---|
| JP | 2008-505380 | 2/2008 |
| JP | 2008-505381 | 2/2008 |
| JP | 2008-117371 | 5/2008 |
| JP | 2008-257629 | 10/2008 |
| JP | 2010-092419 | 4/2010 |
| JP | 2010-092420 | 4/2010 |
| JP | 2011-138278 | 7/2011 |
| JP | 2011-232992 | 11/2011 |
| JP | 2012-009009 | 1/2012 |
| JP | 2012-247938 | 12/2012 |
| WO | 2005/109215 | 11/2005 |
| WO | 2012/169106 | 12/2012 |

OTHER PUBLICATIONS

U.S. Appl. No. 14/164,458 to Tomoki Takano et al., filed Jan. 27, 2014.

* cited by examiner

ELECTRONIC DEVICE WITH TOUCH PANEL FOR DECREASING POINTER WOBBLE

CROSS REFERENCE TO RELATED APPLICATIONS

This application is based on and claims the benefit of Japanese Patent Application No. 2013-036342 filed on Feb. 26, 2013, the contents of which are incorporated herein by reference in its entirety.

BACKGROUND

The present invention relates to an electronic device equipped with a touch panel.

As widely known, a touch panel is a combination of a display device such as a liquid crystal panel and a touch pad (a position input device).

Touch panels include a capacitance type touch panel that can be operated at a height in a predetermined range (hereinafter, this proximity operation will be referred to as a "hover operation") without touching a panel surface with a finger. FIG. 11 is a diagram illustrating a schematic configuration of a capacitance type touch panel. In FIG. 11, a transmission electrode 101 and a reception electrode 102 are disposed on a bottom surface of a plate-like dielectric body 100 so as to be separated from each other, and a driving pulse is applied to the transmission electrode 101 from a driving buffer 103. When the driving pulse is applied, an electric field is generated. When a hand enters the electric field, the number of electric force lines between the transmission electrode 101 and the reception electrode 102 is decreased. A change in the number of electric force lines appears as a change in charges in the reception electrode 102. It is possible to detect the approach of the hand to the touch panel, from the change in charges in the reception electrode 102.

FIGS. 12A to 12C are diagrams illustrating a detection state of a finger when a hand is gradually brought close to a touch panel. FIG. 12A illustrates a state where a hand is away from an electric field, FIG. 12B is a finger hover detection state when the finger enters the electric field, and FIG. 12C is a finger touch detection state when the finger completely enters the electric field and touches the touch panel.

Meanwhile, a method of bringing a finger into contact with a panel surface is disclosed in, for example, Patent Document JP-A-2011-138278. A proximity detection apparatus disclosed in Patent Document JP-A-2011-138278 includes a plurality of electrodes having capacitance that changes by approach and touch of an object to be detected, an electrode control unit that subsequently couples the plurality of electrodes while shifting electrodes having any number of electrodes coupled by any number of slide electrodes so that some of the electrodes overlap each other, to form the electrodes as coupling electrodes, respectively, a capacitance detection unit that detects capacitance of the coupling electrodes coupled by the electrode control unit, and a position calculation unit that calculates an approach or touch position of the object to be detected, on the basis of the capacitance detected by the capacitance detection unit.

SUMMARY

Incidentally, the above-described capacitance type touch panel has problems that even when an operating finger is immobilized in a state where a device (an electronic device equipped with a touch panel) is fixed, a display of a pointer may be wobbled (shaken) or a display of a screen may be wobbled (shaken) although it depends on an application.

In addition, when the electronic device has a drawing mode, there is a concern that at the time of drawing a line using the drawing mode, the line may be displayed jaggedly. FIGS. 13A to 13C illustrate the examples thereof. When a finger is moved in a direction shown by an arrow of FIG. 13A, a quadrangular line is drawn as illustrated in FIG. 13B in a normal state, but a jagged line is drawn as illustrated in FIG. 13C in an abnormal state.

The present invention is contrived in view of such situations, and an object thereof is to provide an electronic device equipped with a touch panel, in which, even when an operating finger is immobilized in a state where the device is fixed, a display of a pointer is not wobbled, or a display of a screen is not wobbled. In addition, when a line is drawn using a drawing mode, the line is not displayed jaggedly.

According to one aspect of the invention, there is provided an electronic device comprising: a planar display unit; and a touch panel which is disposed so as to overlap the display unit and is capable of detecting a vertical distance between two-dimensional coordinates along a surface of the display unit and an indicator, wherein resolution of the two-dimensional coordinates becomes finer as the vertical distance decreases.

According to the above construction, as the vertical distance from the touch panel to the operating finger decreases, resolution of the two-dimensional coordinates along the surface of the display unit becomes finer. Therefore, even when an operating finger is immobilized in a state where the electronic device is fixed, a display of a pointer is not wobbled, or a display of a screen is not wobbled. In addition, when a line is drawn using a drawing mode, the line is not displayed jaggedly.

In the above electronic device, the resolution may become finest when the vertical distance is minimized.

In the above electronic device, the resolution may be switched in at least two stages.

The electronic device may further comprise a control unit capable of dividing the two-dimensional coordinates into a plurality of regions and outputting one two-dimensional coordinates with respect to each divided region, and wherein the number of the divided regions is increased as the vertical distance decreases.

In the above electronic device, the two-dimensional coordinates may be an X coordinate and a Y coordinate, and wherein the region may be divided with respect to the X coordinate and the Y coordinate.

In the above electronic device, the two-dimensional coordinate to be output may be a central coordinate of the one divided region.

In the above electronic device, two-dimensional coordinates to be output may be capable of being held, wherein a two-dimensional distance between the held two-dimensional coordinates and newly detected two-dimensional coordinates may be calculated, wherein when the two-dimensional distance is greater than a predetermined value, the newly detected two-dimensional coordinates may be capable of being output, and wherein the predetermined value may be set to be smaller as the vertical distance decreases.

According to the above construction, when a two-dimensional distance between the held two-dimensional coordinates and newly detected two-dimensional coordinates is greater than a predetermined value, the newly detected two-dimensional coordinates is output. Therefore, even when an operating finger is immobilized in a state where the electronic device is fixed, a display of a pointer is not wobbled, or a display of a screen is not wobbled. In addition, when a line is drawn using a drawing mode, the line is not displayed jaggedly.

In the above electronic device, the output newly detected two-dimensional coordinates may be held in place of the held two-dimensional coordinates.

In the above electronic device, the two-dimensional coordinates to be output may be capable of being displayed on at least the display unit.

According to the present invention, in an electronic device equipped with a touch panel, even when an operating finger is immobilized in a state where the electronic device is fixed, a display of a pointer is not wobbled, or a display of a screen is not wobbled. In addition, when a line is drawn using a drawing mode, the line is not displayed jaggedly.

DETAILED DESCRIPTION OF EMBODIMENTS

Hereinafter, preferred embodiments for implementing the present invention will be described in detail with reference to the accompanying drawings.

First Embodiment

Figure 1:
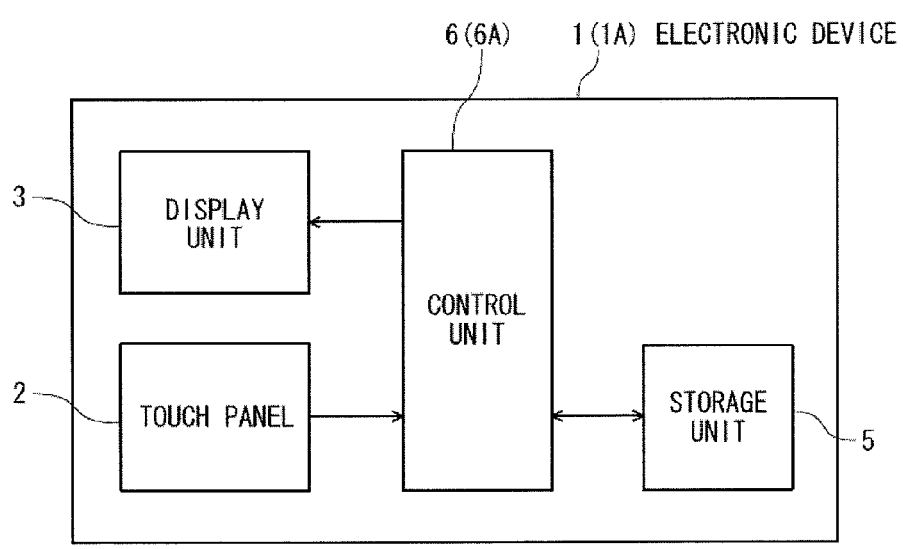
FIG. 1 is a block diagram illustrating a schematic configuration of an electronic device according to a first embodiment of the present invention.
Figure 2:
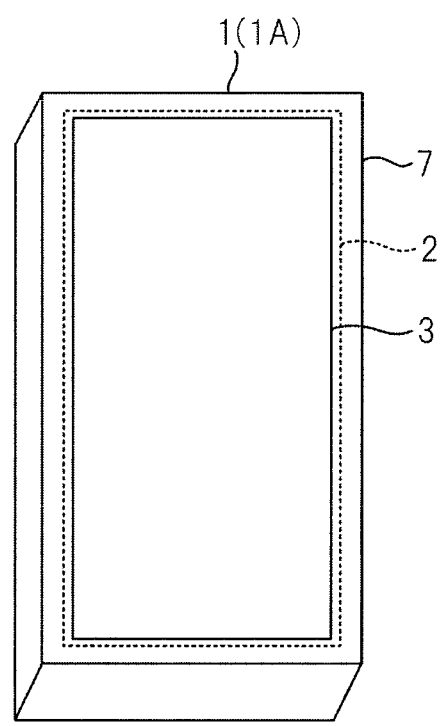
FIG. 2 is a perspective view illustrating a contour of the electronic device according to the first embodiment of the present invention.

FIG. 1 is a block diagram illustrating a schematic configuration of an electronic device according to a first embodiment of the present invention. FIG. 2 is a perspective view illustrating a contour of the electronic device of FIG. 1. Meanwhile, an electronic device 1 according to this embodiment is a portable wireless device, which is referred to as, for example, a smartphone, to which the present invention is applied. In the block diagram of FIG. 1, a portion serving as a wireless device is omitted.

In FIG. 1, the electronic device 1 according to this embodiment includes a touch panel 2, a display unit 3, a storage unit 5, and a control unit 6. In addition, as illustrated in FIG. 2, the electronic device 1 according to this embodiment includes a housing 7 having a longitudinal rectangular shape.

The touch panel 2 and the display unit 3 which have an area slightly smaller than an area of a front surface of the housing 7 are disposed on the front surface side of the housing 7. The touch panel 2 is disposed so as to overlap the front surface side of the display unit 3. The display unit 3 has a planar shape and a longitudinal rectangular shape when seen in a plan view.

As the touch panel 2, a capacitance type touch panel is adopted in which an operation (referred to as "hover operation") can be performed at a height in a predetermined range without touching the panel surface thereof using an indicator (a user's finger, a pen, or the like, and will be treated as a "finger" in this embodiment). The touch panel is disposed so as to overlap the display unit 3. The touch panel 2 includes a transmission electrode and a reception electrode which are not shown in the drawing, the transmission electrode and the reception electrode are disposed on a bottom surface of a plate-like dielectric body so as to be separated from each other, and a driving pulse based on a transmission signal is applied to the transmission electrode. An electric field is generated from the transmission electrode by the driving pulse being applied to the transmission electrode. When a finger enters the electric field, the number of electric force lines between the transmission electrode and the reception electrode is decreased. A change in the number of electric force lines appears as a change in charges in the reception electrode. The touch panel 2 detects the finger from a reception signal in response to the change in charges in the reception electrode, and outputs two-dimensional coordinates (x, y) of the finger and a vertical distance z between the finger and the touch panel 2 to the control unit 6.

The display unit 3 has a rectangular shape, and is used as a display for operating the electronic device 1 or a display of an image or the like. A liquid crystal display (LCD), an organic electro luminescence (EL), or an electronic paper is used as the display unit 3. The storage unit 5 includes a volatile memory such as a dynamic random access memory (DRAM) and stores setting which is performed by a user when using the electronic device 1. The control unit 6 is constituted by a central processing unit (CPU), a read only memory (ROM), a random access memory (RAM), and an interface circuit. The ROM stores a program for controlling the CPU, and the RAM is used in the operation of the CPU. The control unit 6 has a pointer mode and a normal mode as operation modes. The pointer mode is a mode which is used when performing a pad operation, and the normal mode is a mode in which a touch position is the same as a function operating position.

Figure 3:
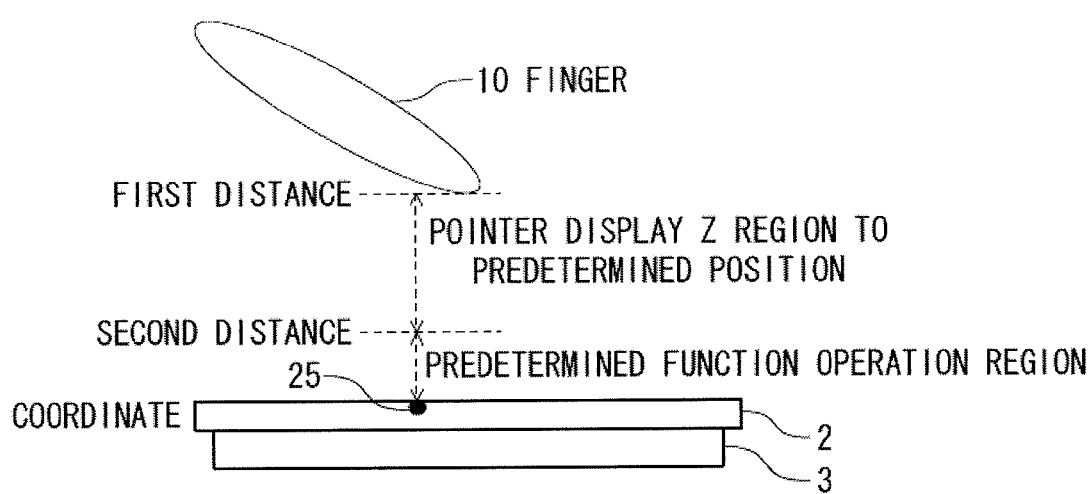
FIG. 3 is a diagram illustrating a positional relationship between a touch panel in the electronic device according to the first embodiment of the present invention and a finger which is an indicator.

Similarly to an operation in the normal mode, an operation in the pointer mode is an indirect operation (the above-described hover operation) in which an operation is performed above the touch panel 2 without directly touching the touch panel 2. A finger is held up over a predetermined region of the touch panel 2 and within a predetermined distance range, and thus the mode is converted into the pointer mode. After the conversion into the pointer mode, the finger is moved, and a pointer (not shown) is moved in compliance with the movement of the finger. In the pointer mode, a predetermined function is performed in response to the position of the pointer. FIG. 3 is a diagram illustrating a positional relationship between the touch panel 2 and a finger 10 which is an indicator. As illustrated in FIG. 3, the finger 10 is held up over the touch panel 2 within a distance range which is equal to or less than a first distance and which is less than the first distance and greater than a second distance, and thus the mode is converted into the pointer mode. A coordinate (exactly, a coordinate of a finger tip) 25 of the finger 10 which is in a hover state is detected by the conversion into the pointer mode.

The control unit 6 performs jitter suppression for suppressing the fluctuation in a time axis direction, and performs a rounding process of two-dimensional coordinates according to the vertical distance z between the finger 10 and the touch panel 2 (as the distance increases, resolution is reduced). The rounding process increases the resolution (makes the resolution finer) of two-dimensional coordinates (x, y) in the touch panel 2 as the vertical distance z decreases. In this case, the resolution of the two-dimensional coordinates (x, y) is maximized when the vertical distance z has a minimum value.

Figure 4A:
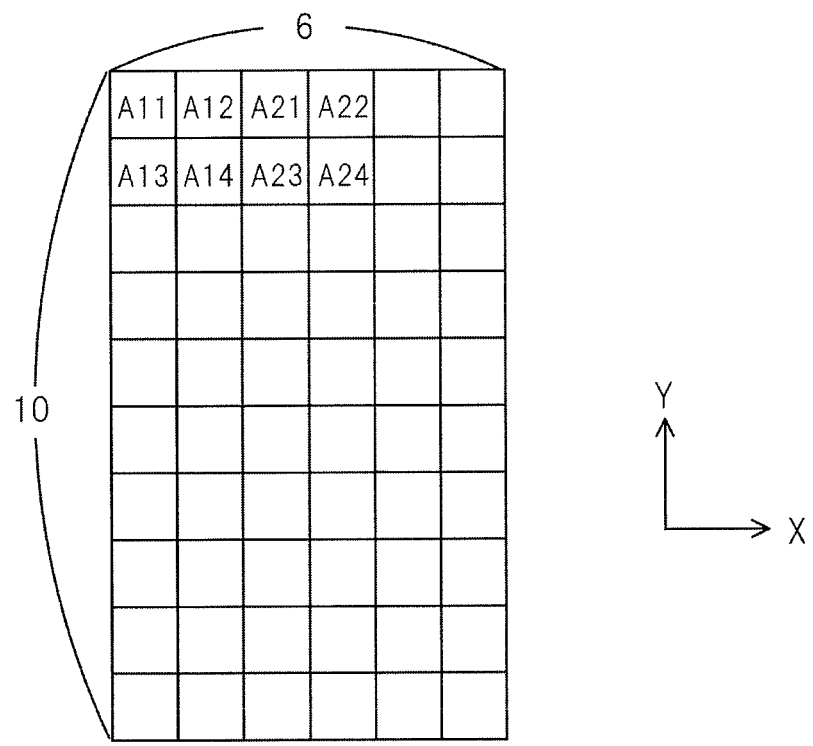
FIGS. 4A and 4B are diagrams illustrating an example in which the entire region of the touch panel in the electronic device according to the first embodiment of the present invention is divided into a plurality of regions.
Figure 4B:
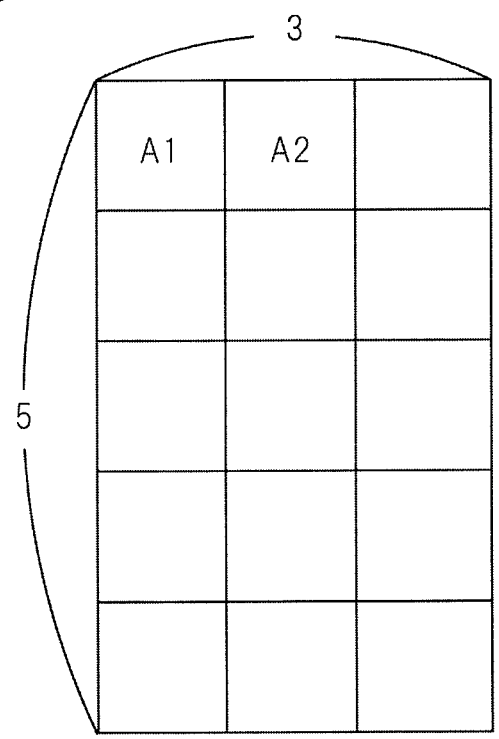

FIGS. 4A and 4B are diagrams illustrating an example in which the entire region of the touch panel 2 is divided into a plurality of regions. FIG. 4A illustrates an example in which the entire region of the touch panel 2 is divided into "60" regions of "6" regions in an X-axis direction by "10" regions in a Y-axis direction, and FIG. 4B illustrates an example in which the entire region of the touch panel 2 is divided into "15" regions of "3" regions in the X-axis direction by "5" regions in the Y-axis direction. Meanwhile, in the 15-division example of FIG. 4B, a sign is assigned to each region. For example, a sign A1 is assigned to the first one region, and a sign A2 is assigned to the next region. On the other hand, in the 60-division example of FIG. 4A, the number of divisions is four times the 15 divisions of FIG. 4B and thus signs A11, A12, A13, and A14 are assigned in response to the sign A1 of the 15 divisions of FIG. 4B and signs A21, A22, A23, and A24 are assigned in response to the sign A2 of the 15 division. One two-dimensional coordinate (x, y) is output with respect to one region which is divided in this manner.

Figure 5:
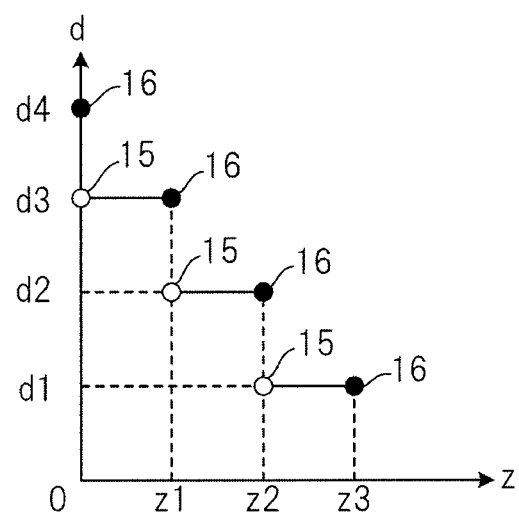
FIG. 5 is a diagram illustrating an example of division definition of a rounding process in the electronic device according to the first embodiment of the present invention.

FIG. 5 is a diagram illustrating an example of division definition of a rounding process. In the example illustrated in FIG. 5, the number of divisions is set to three stages. That is, the number of divisions is set to d3 in a range of greater than 0 and equal to or less than z1, the number of divisions is set to d2 in a range of greater than z1 and equal to or less than z2, and the number of divisions is set to d1 in a range of greater than z2 and equal to or less than z3. Meanwhile, in FIG. 5, a white circle 15 indicates that the corresponding number of divisions is not included and a black circle 16 indicates that the corresponding number of divisions is included. For example, when the vertical distance z is "0", the number of divisions d3 is not included, and when the vertical distance is "z1", the number of divisions d3 is included. The number of divisions d2 is, for example, "15" in response to FIG. 4B, and the number of divisions d3 is, for example, "60" in response to FIG. 4A. Meanwhile, in FIG. 5, the number of divisions d4 is the maximum number of divisions. The control unit 6 converts a coordinate detected within each region into a central coordinate of the region in the rounding process.

Figure 6:
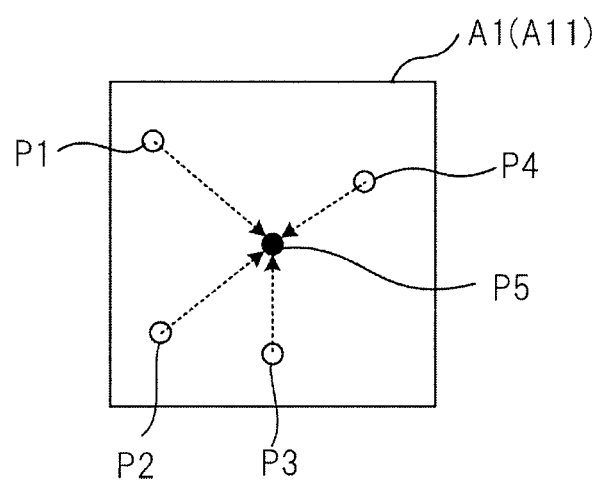
FIG. 6 is a diagram illustrating a coordinate conversion example of the rounding process in the electronic device according to the first embodiment of the present invention.

FIG. 6 is a diagram illustrating a coordinate conversion example of a rounding process. A region illustrated in FIG. 6 is, for example, A11 in the 60-division example illustrated in FIG. 4A, and is, for example, A1 in the 15-division example illustrated in FIG. 4B. Positions P1 to P4 shown by a white circle are coordinates before correction, respectively, and a position P5 shown by a black circle is a coordinate after correction. In this case, the coordinate is corrected to the center position of the region. In the rounding process, when the vertical distance z has a value equal to or less than a fixed value, the rounding of the coordinate is performed by the number of divisions d illustrated in FIG. 5 in response to a value of the vertical distance z at that time, to output the central coordinate (two-dimensional coordinates (x, y)) of the one region divided.

Figure 7:
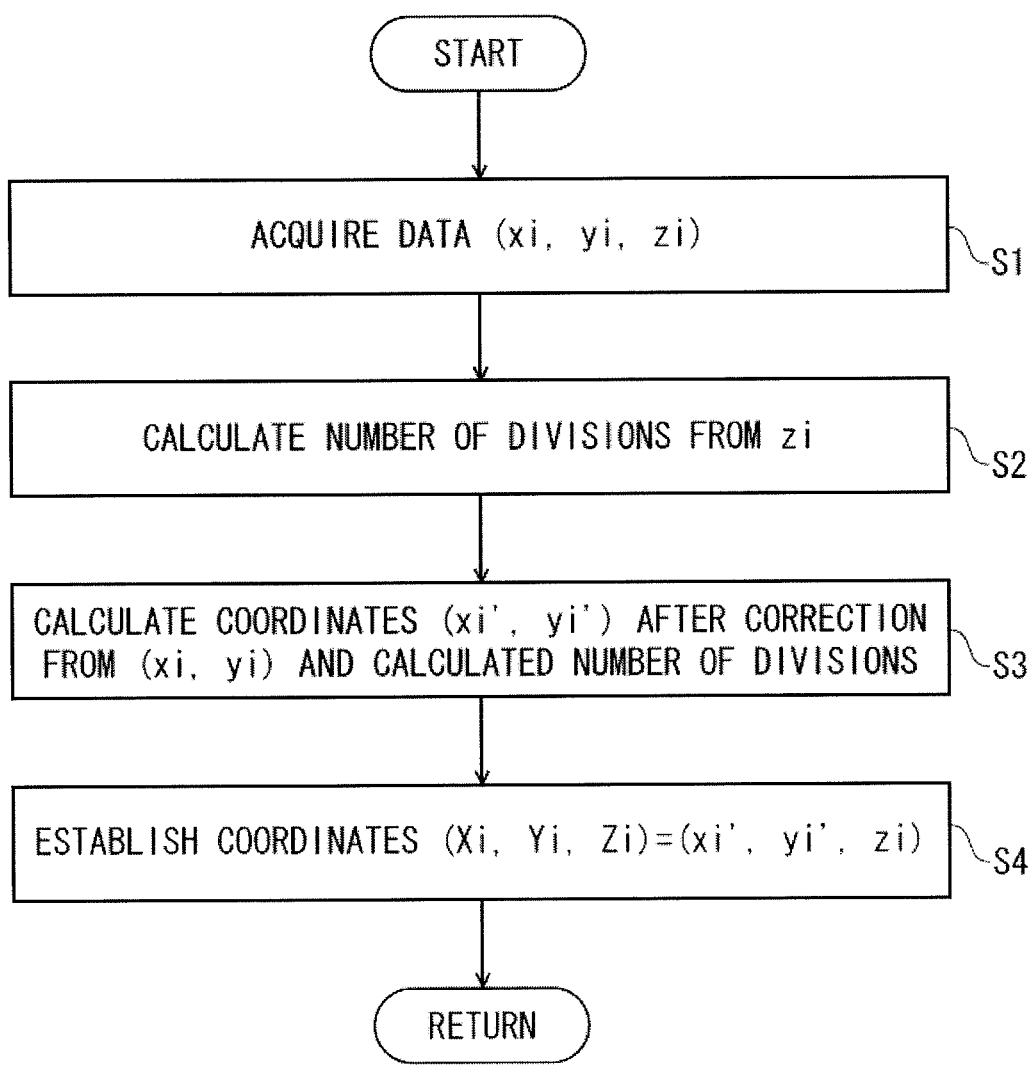
FIG. 7 is a flow chart illustrating a coordinate establishment process in a control unit of the electronic device according to the first embodiment of the present invention.

FIG. 7 is a flow chart illustrating the coordinate establishment process using the control unit 6. In FIG. 7, the control unit 6 acquires current two-dimensional coordinates (xi, yi) of the finger 10 which are output from the touch panel 2 and a vertical distance zi (step S1). Subsequently, the number of divisions of the touch panel 2 is calculated from the acquired vertical distance zi (step S2). Then, two-dimensional coordinates (xi', yi') after correction are calculated from the two-dimensional coordinates (xi, yi) and the calculated number of divisions (step S3). Then, the calculated two-dimensional coordinates (xi', yi') after correction are established as new coordinates (Xi, Yi, Zi)=(xi', yi', zi) (step S4).

When a vertical distance between two-dimensional coordinates along a surface of a display unit and a finger is able to be detected using a capacitance type touch panel, as the vertical distance increases, the amount of change in an electric force line by the existence of the finger is decreased relative to noise. For this reason, even in a state where the finger is immobilized with respect to two-dimensional coordinates, an appropriate coordinate corresponding to the immobilization may not be able to be obtained. For example, even when an operating finger is immobilized in a state where an electronic device is fixed, the wobble of a display of a pointer or the wobble of a display of a screen may spoil a view, or when a line is drawn using a drawing mode, the line may be displayed jaggedly.

According to the electronic device 1 of this embodiment, provided are the display unit 3 having a planar shape, and the touch panel 2 which is disposed so as to overlap the display unit 3 and is capable of detecting the vertical distance zi between the two-dimensional coordinates (xi, yi) along the surface of the display unit 3 and the finger 10. As the vertical distance zi decreases, resolution of the two-dimensional coordinates (xi, yi) becomes finer. Thus, even when the operating finger 10 is immobilized in a state where the electronic device 1 is fixed, the wobble of a display of a pointer or the wobble of a display of a screen may not spoil a view. In addition, when a line is drawn using a drawing mode, the line is not displayed jaggedly.

Meanwhile, in the electronic device 1 according to this embodiment, a ROM stores a program in which the process illustrated in the flow chart of FIG. 7 is described. However, the program may also be stored in a storage medium such as a magnetic disc, an optical disc, an magneto-optical disc, or a flash memory and be distributed, or can also be saved in a server (not shown) on a network such as the Internet so as to be downloaded using an electric communication line.

In addition, the electronic device 1 according to this embodiment is a portable wireless device, which is referred to as a smartphone, to which the present invention is applied. However, the present invention is not limited to the portable wireless device, and can also be applied to household electrical appliances such as a microwave oven or an operation panel of a navigation device of a vehicle.

Second Embodiment

The above-described electronic device 1 according to the first embodiment performs the rounding process of the two-dimensional coordinates (xi, yi) according to the vertical distance zi between the finger 10 and the touch panel 2 (as the distance increases, resolution is reduced). However, an electronic device according to a second embodiment performs a process of changing the amount of a coordinate filter (a filter value r to be described later) according to a vertical distance zi between a finger 10 and a touch panel 2.

Meanwhile, the electronic device according to the second embodiment has the same hardware configuration as the electronic device 1 according to the first embodiment except for some different functions, and thus FIG. 1 is cited herein. In this case, a sign 6A is given to a control unit having a different function, and a sign 1A is given to the electronic device.

Figure 8:
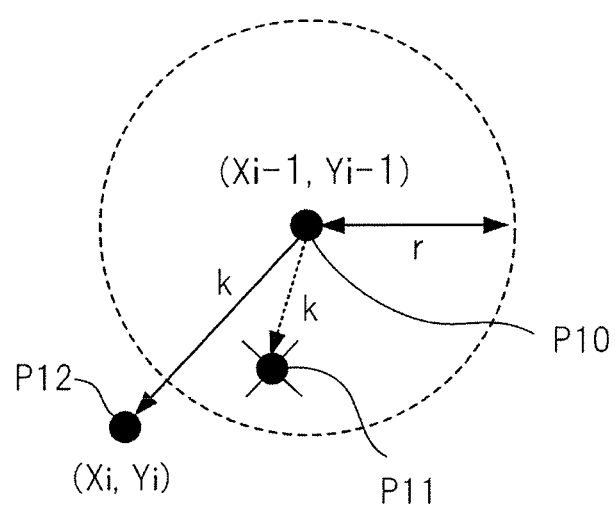
FIG. 8 is a diagram illustrating a coordinate establishment process in a control unit of an electronic device according to a second embodiment of the present invention.
Figure 9:
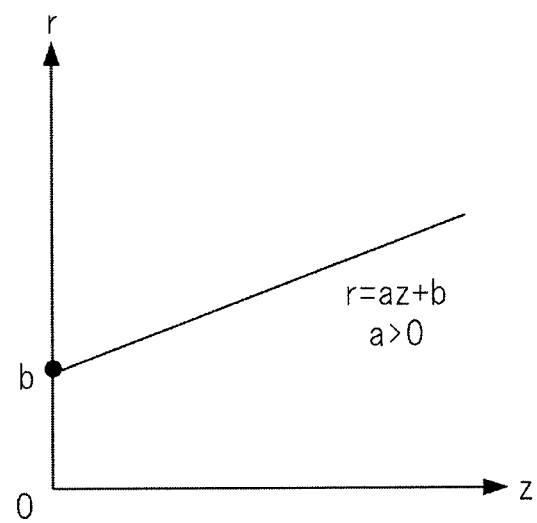
FIG. 9 is a diagram illustrating a linear function for obtaining a filter value in the control unit of the electronic device according to the second embodiment of the present invention.

FIG. 8 is a diagram illustrating a coordinate establishment process in the control unit 6A. In FIG. 8, a position P10 is the last (previous) two-dimensional coordinates (Xi−1, Yi−1), and r is a filter value. The filter value r is obtained from a linear function r=az+b (a>0) illustrated in FIG. 9. Meanwhile, a and b are predetermined constants, respectively. The filter value r becomes smaller as the vertical distance zi between the finger 10 and the touch panel 2 decreases.

When current two-dimensional coordinates (xi, yi) are positioned at a position P11 within the filter value r with respect to the previous two-dimensional coordinates (Xi−1, Yi−1), the current two-dimensional coordinates (xi, yi) are not output. That is, the previous two-dimensional coordinates (Xi−1, Yi−1) are maintained. When the current two-dimensional coordinates (xi, yi) are positioned at a position P12 exceeding the filter value r with respect to the previous two-dimensional coordinates (Xi−1, Yi−1), the current two-dimensional coordinates (xi, yi) are established, and thus two-dimensional coordinates (Xi, Yi) are output.

The control unit 6A holds the output two-dimensional coordinates, and calculates a two-dimensional distance between the held two-dimensional coordinates and new two-dimensional coordinates. When the calculated two-dimensional distance is greater than a filter value (a predetermined value), new two-dimensional coordinates are output. When the calculated two-dimensional distance is smaller than the filter value, previous two-dimensional coordinates are maintained. The control unit 6A displays two-dimensional coordinates capable of being output, on a display unit 3.

Figure 10:
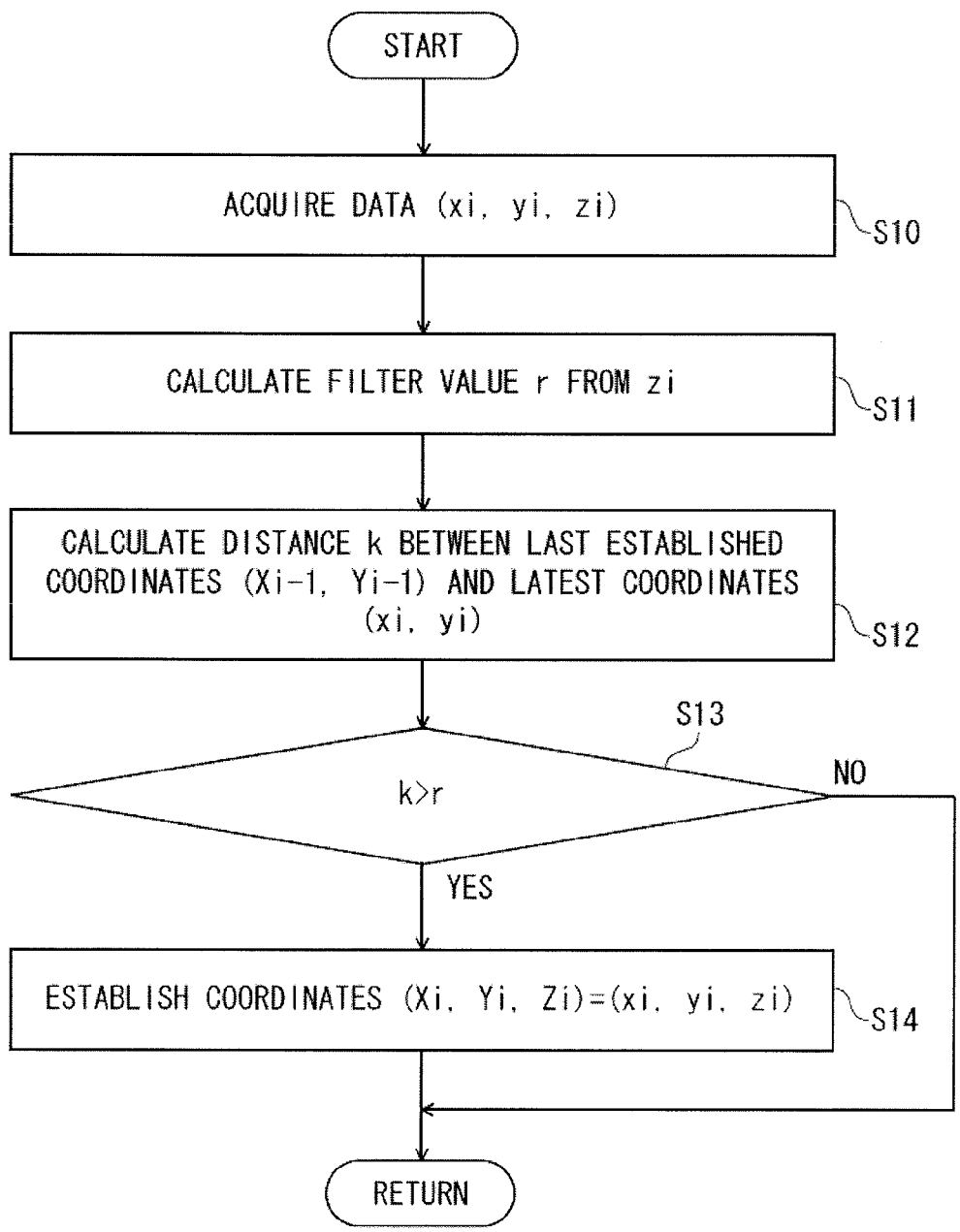
FIG. 10 is a flow chart illustrating a coordinate establishment process in the control unit of the electronic device according to the second embodiment of the present invention.
Figure 11:
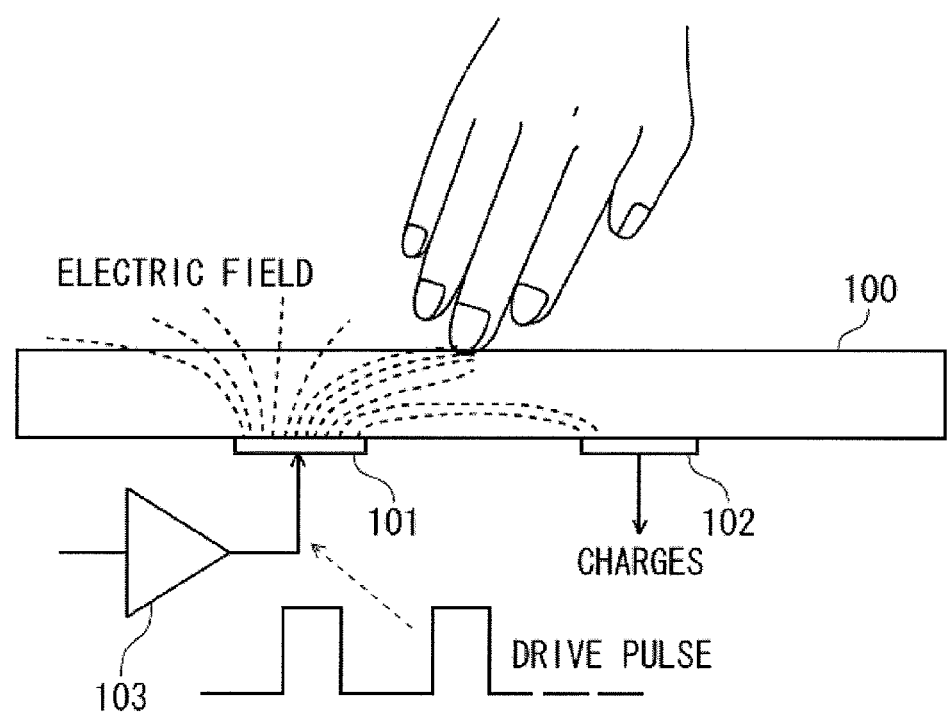
FIG. 11 is a diagram illustrating a schematic configuration of a capacitance type touch panel.
Figure 12A:
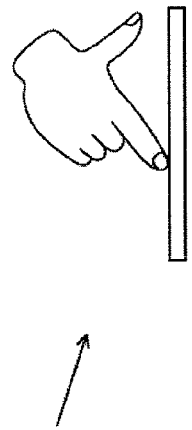
FIGS. 12A to 12C are diagrams illustrating a detection state of a finger when a hand is gradually brought close to a touch panel.
Figure 12A:
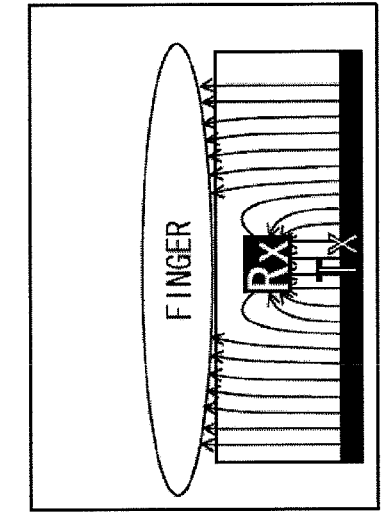
Figure 12B:
Figure 12B:
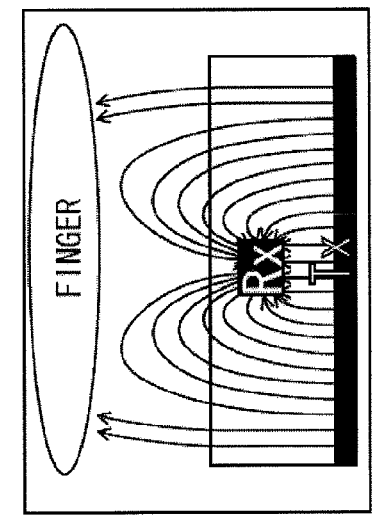
Figure 12C:
Figure 12C:
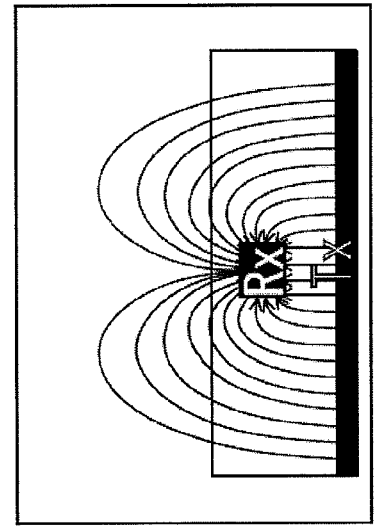
Figure 13A:
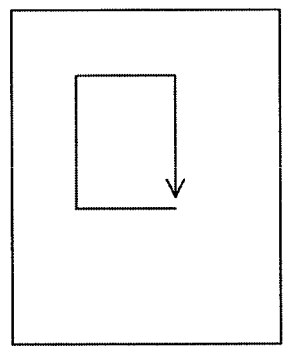
FIGS. 13A to 13C are diagrams illustrating a problem occurring when a line is drawn using a drawing mode.
Figure 13B:
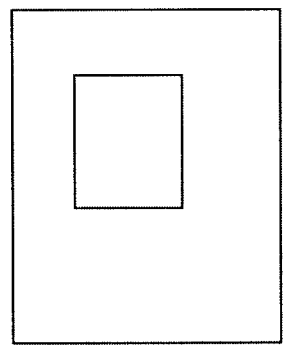
Figure 13C:
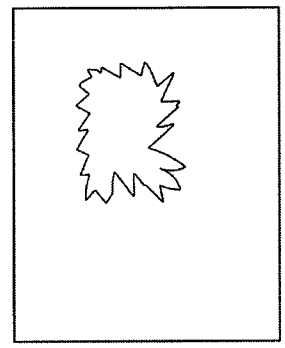

FIG. 10 is a flow chart illustrating the coordinate establishment process using the control unit 6A. In FIG. 10, the control unit 6A acquires the current two-dimensional coordinates (xi, yi) of the finger 10 which are output from the touch panel 2, and the vertical distance zi (step S10). Subsequently, the filter value r is calculated from the acquired vertical distance zi (step S11). Then, a distance k between the two-dimensional coordinates (Xi−1, Yi−1) which are established immediately before and the latest two-dimensional coordinates (xi, yi) is calculated (step S12). Subsequently, it is determined whether the calculated distance k exceeds the filter value r (step S13). When it is determined that the calculated distance k is equal to or less than the filter value r (when it is determined to be "No" in step S13), the process returns to the process of step S10. On the other hand, when it is determined that the calculated distance k exceeds the filter value r (when it is determined to be "Yes" in step S13), new coordinates (Xi, Yi, Zi)=(xi, yi, zi) are established (step S14). After the new coordinates (Xi, Yi, Zi) are established, the process returns to the process of step S10.

In this manner, according to the electronic device 1A of this embodiment, a coordinate to be output is held, and a two-dimensional distance k between the held coordinate and a new coordinate is calculated. When the calculated two-dimensional distance k is greater than a filter value r, the new coordinate is output, and when the calculated two-dimensional distance k is smaller than the filter value r, the previous coordinate is maintained. Thus, similarly to the above-described electronic device 1 according to the first embodiment, even when the operating finger 10 is immobilized in a state where the electronic device 1 is fixed, the wobble of a display of a pointer or the wobble of a display of a screen may not spoil a view. In addition, when a line is drawn using a drawing mode, the line is not displayed jaggedly.

Meanwhile, in the electronic device 1A according to this embodiment, a ROM stores a program in which the process illustrated in the flow chart of FIG. 10 is described. However, the program may also be stored in a storage medium such as a magnetic disc, an optical disc, an magneto-optical disc, or a flash memory and be distributed, or can also be saved in a server (not shown) on a network such as the Internet so as to be downloaded using an electric communication line.

In addition, similarly to the above-described electronic device 1 according to the first embodiment, the electronic device 1A according to this embodiment is a portable wireless device, which is referred to as a smartphone, to which the present invention is applied. However, the present invention is not limited to the portable wireless device, and can also be applied to household electrical appliances such as a microwave oven or an operation panel of a navigation device of a vehicle.

An electronic device equipped with a touch panel of the present invention has effects that even when an operating finger is immobilized in a state where the electronic device is fixed, a display of a pointer is not wobbled or a display of a screen is not wobbled, and when a line is drawn using a drawing mode, the line is not displayed jaggedly. In addition, the present invention can be applied to an electronic device using a capacitance type touch panel such as a smartphone.

What is claimed is:

1. An electronic device comprising:
   a planar display; and
   a touch panel that overlaps the display and is capable of detecting a two-dimensional coordinate along a surface of the display corresponding to a position of an indicator and a vertical distance between the touch panel and the indicator,
   wherein, when the vertical distance is within a predetermined range greater than zero, a pointer is capable of being output at the two-dimensional coordinate on the display,
   wherein a two-dimensional coordinate at which the pointer is to be output is capable of being stored,
   wherein a two-dimensional distance between the stored two-dimensional coordinate and a new two-dimensional coordinate is calculated,
   wherein when the calculated two-dimensional distance is equal to or less than a predetermined value, the pointer is output at the stored two-dimensional coordinate on the display, the predetermined value decreasing as the vertical distance decreases, and
   wherein, when the calculated two-dimensional distance is greater than the predetermined value, the pointer is output at the new two-dimensional coordinate on the display.

2. The electronic device according to claim 1, wherein the new two-dimensional coordinate is stored in place of the stored two-dimensional coordinate.

3. The electronic device according to claim 1, wherein the predetermined value is minimized when the vertical distance is minimized.

4. The electronic device according to claim 1, wherein the predetermined value is switched in at least two stages.

5. An operation method of an electronic device including a planar display and a touch panel that overlaps the display, the operation method comprising:
- storing a two-dimensional coordinate at which a pointer is to be output on the display;
- detecting, by the touch panel, a new two-dimensional coordinate along a surface of the display corresponding to a position of an indicator and a vertical distance between the touch panel and the indicator;
- calculating, when the vertical distance is within a predetermined range greater than zero, a two-dimensional distance between the stored two-dimensional coordinate and the new two-dimensional coordinate;
- outputting, when the calculated two-dimensional distance is equal to or less than a predetermined value, the pointer at the stored two-dimensional coordinate on the display, the predetermined value decreasing as the vertical distance decreases; and
- outputting, when the calculated two-dimensional distance is greater than the predetermined value, the pointer at the new two-dimensional coordinate on the display.

\* \* \* \* \*